No. 830,262. PATENTED SEPT. 4, 1906.
L. TORDA.
CONTINUOUS CURRENT ELECTRIC MOTOR AND GENERATOR.
APPLICATION FILED MAY 6, 1905.
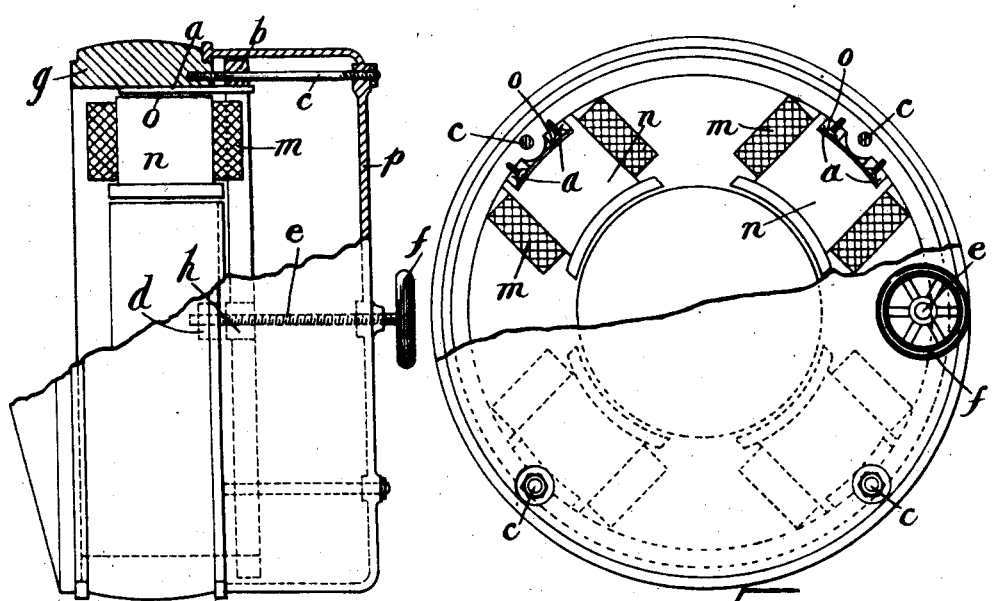
Fig. 1. Fig. 2.
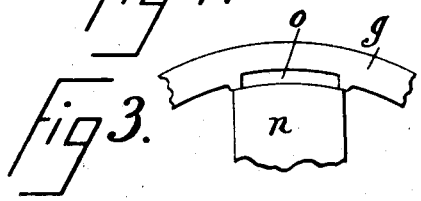
Fig. 3.
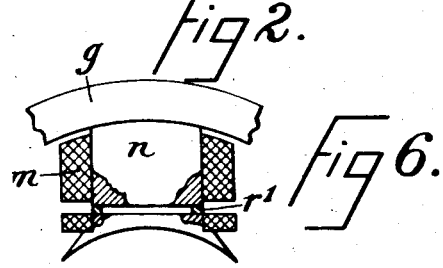
Fig. 6.
Fig. 4. Fig. 8.
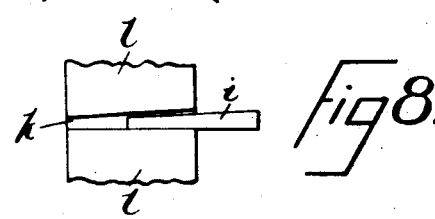
Fig. 5. Fig. 7.
WITNESSES
M. Rader
J. B. Larsen
INVENTOR
Ludwig Torda
BY
Edgar Tate &Co
ATTORNEYS.

UNITED STATES PATENT OFFICE.

LUDWIG TORDA, OF BARKING, ENGLAND.

CONTINUOUS-CURRENT ELECTRIC MOTOR AND GENERATOR.

No. 830,262.　　　　Specification of Letters Patent.　　　　Patented Sept. 4, 1906.

Application filed May 6, 1905. Serial No. 259,115.

*To all whom it may concern:*

Be it known that I, LUDWIG TORDA, a subject of the Emperor of Austria-Hungary, residing at Barking, in the county of Essex, England, have invented certain new and useful Improvements in Continuous-Current Electric Motors and Generators, of which the following is a specification, such as will enable those skilled in the art to which it appertains to make and use the same.

This invention for improvements in continuous-current electric motors and generators has for its principal object to effect a speed variation of the motors or a voltage regulation of the dynamos. For this purpose I apply the principle of the variation of the resistance of the magnetic circuits or, briefly, reluctance in the machine. Electrical machines in which this general principle is applied are already known; but in these previous constructions masses of iron have been inserted in the magnetic circuit in close proximity to the air-gap, where they have been under the magnetic influence of the armature.

By means of the construction hereinafter described and claimed I discard the separate apparatus—that is, field-regulating resistance—and by this means diminishing the cause of troubles and insuring a continuous smooth speed regulation, whereby the number of different speeds obtainable is unlimited, and while these results have already been obtained by previous constructions, involving great constructional difficulties because of the comparatively heavy masses moved or relatively complicated devices applied, I obtain the variation of the reluctance by forming air ducts or passages inside the stationary field-magnet system running at right angles or approximately at right angles to the magnet-lines and by adjustably arranging therein paramagnetic plates adapted when fully inserted to fill or nearly fill the ducts.

The invention is fully disclosed in the following specification, of which the accompanying drawings form a part, in which the separate parts of my improvement are designated by suitable reference characters in each of the views, and in which—

Figure 1 is a side elevation, partly in section, of a dynamic machine with my improvement arranged thereon. Fig. 2 is a similar face view thereof, partly in section, and showing the air-ducts which I employ; and Figs. 3 to 8, inclusive, are modifications of the air-ducts shown in Fig. 2.

In the drawings forming part of this specification I have shown at $g$ a yoke of a dynamic machine and on one side of which is mounted a casing $p$, held to the yoke $g$ by means of screw-threaded rods or bolts $c$, and the yoke $g$ is provided with a plurality of field-coils $m$, provided with pole-cores $n$, said pole-cores in the form of construction shown in Fig. 2 being provided with a passage or air-duct $o$.

Slidably mounted on the rods $c$ is an iron ring $b$, with which is connected a plurality of paramagnetic plates $a$, one of which operates in each of the air-ducts $o$, and the ring $b$ is provided with a lug $h$, through which passes a screw-threaded spindle $e$, provided with a hand-wheel $f$, mounted outside of the casing $p$, said spindle being rotatably mounted in the yoke $g$, as indicated at $d$, and when the hand-wheel $f$ is turned and the spindle $e$ rotated thereby the ring $b$ is moved toward and from the yoke $g$ correspondingly and carries therewith the paramagnetic plates $a$, thereby increasing or diminishing the air-space in the air-ducts $o$ correspondingly, and these air-ducts, similar to the air-ducts between the field and armature, subdivide the field-magnet system into several parts, and the variation of the reluctance is obtained by pushing in or pulling out the paramagnetic plates $a$ in the air-ducts $o$.

The advantages of placing these air-ducts and plates inside the field-magnet system, especially in parts of the pole-cores remote from the armature, are as follows:

First. The prevention of eddy-currents in the adjustable plates and in connection with this constructional and economical advantages. The air-gaps of the improved machines may be made smaller, as the setting up of eddy-currents is avoided by the abolition of massive iron parts in close proximity to the armature-surface, and the smaller the air-gap the thinner and lighter can the iron plates be made in order to obtain a certain range of regulation, and at the same time the whole regulating device and the whole machine (also on account of the reduction in the weight of the field copper) become lighter and much less expensive.

Second. An essential constructional advantage. The plates can be fastened directly to an iron ring in the casing, which is an important advantage, especially where the plates are placed between the yoke and the field-coils. Magnetically the ring has the advantageous effect of reducing somewhat the reluctance of the yoke; but as a substantial advantage the direct attaching of the plates to an iron ring means a considerable simplification and cheapening of the construction, as will be seen.

Third. A considerable reduction of the weight of the movable masses.

By my arrangement of the air-ducts inside the field-magnet systems in positions where the magnetic induction has the greatest value the masses of the movable iron plates are reduced to a minimum. As the width of the air-ducts and correspondingly the thickness of the plates is small, the masses which are to be moved are comparatively small.

I am aware that adjustable blocks of iron, deflectors, or rods have heretofore been introduced in air-gaps located in the yoke or pole-pieces of dynamos and motors or between the armature and the poles of such machines for the purpose of controlling the magnetic resistance or reluctance of the magnetic currents; but all such devices require more or less heavy masses of iron, which latter are subjected to the influence of the so-called "eddy-currents," derogatory to the efficiency of the apparatus, while by means of my invention the adjustable thin paramagnetic plates placed in slots or air-ducts and approximately rectangular to the direction of the magnetic lines and remote from the air-gap between the armature and the magnet-poles are not subjected to such objectionable eddy-currents, and thereby very materially contribute to the efficiency of the apparatus.

It may be mentioned that with regard to commutation it is immaterial whether the increase of the length of the air-path of the magnetic circuit is varied inside the field-magnet system or directly on the air-gap, as the fact is that the commutation property of a continuous-current machine is practically not affected by altering the length of the air-gap between the armature and the pole-shoe surface.

This invention permits of the application of a light mechanical device which is most effective, reliable, and simple, and therefore cheap in manufacture. It can be applied to any type of machine, being equally adapted for small motors and dynamos, as well as for large sizes, as used for rolling-mills, &c. The range of speed regulation can be easily made considerable—as, for instance, is often required for printing-machines, &c.—this without affecting the good general working of the machine. The device can be applied at any part of the field-magnet system, as preferred. The air-ducts and plates can be placed, for instance, inside the yoke, Fig. 3, inside the pole-cores, Figs. 4 and 6, partly in the yoke, partly in the pole-cores, Fig. 5, between the pole-cores and pole-shoes, Fig. 7.

For constructional reasons portions $r$ of the iron cores, Figs. 4, 5, 7, may be left at opposite sides of the air-ducts, or the core may be cut through entirely and distance-pieces $r'$, Fig. 6, inserted to correspond with the depth of the air-duct. These distance-pieces, if formed of iron, become highly saturated, but can be made of non-magnetic materials, if preferred. The plates can also be wedge-shaped and the air-ducts correspondingly formed, if preferred. This form is shown in Fig. 8, where $i$ is the wedge-shaped plate, $k$ the air-duct formed correspondingly, and $l\ l$ portions of the field-magnet system.

The principle of reluctance variation on which the application of this more general shape is based is the simultaneous alteration of the section and of the length of the air-path inside of the field-magnet system, whereby at the same time the air reluctance is shunted by an iron reluctance. The principle is applied also in the above-described more special cases, where the air-ducts and the plates are surrounded by parallel planes.

The subject of this invention is applicable for bipolar and multipolar machines, as well as for open or inclosed types, and also for machines with horizontal or vertical shafts.

It will be apparent that various mean for moving the paramagnetic plates inwardly and outwardly may be employed, and various other modifications of the construction herein shown and described may be made without departing from the spirit of my invention or sacrificing its advantages, and, with this reservation—

What I claim as new, and desire to secure by Letters Patent, is—

1. In an apparatus for varying the speed of continuous-current motors, a field-magnet system, a yoke, a plurality of magnet-cores, and an iron plate adjustably mounted in an air-duct in the field-magnet system between each magnet-core and the yoke, substantially as shown and described.

2. In a dynamic machine, comprising a yoke, a plurality of field-magnets arranged therein, a ring slidably connected with said yoke and movable toward and from the same, a plurality of paramagnetic plates secured to said ring, each of said plates being movable transversely of said yoke between a corresponding one of said field-magnets and said yoke, and means for moving said ring, substantially as shown and described.

3. In a dynamic machine, comprising a yoke, a plurality of field-magnets arranged therein, a ring slidably connected with said yoke and movable toward and from the same, a plurality of paramagnetic plates secured to said ring, each of said plates being movable transversely of said yoke between a corresponding one of said field-magnets and said yoke, and means for moving said ring, comprising a screw-threaded spindle operating therein, and means for rotating said spindle, substantially as shown and described.

In testimony that I claim the foregoing as my invention I have signed my name, in presence of the subscribing witnesses, this 20th day of April, 1905.

LUDWIG TORDA.

Witnesses:
H. D. JAMESON,
F. L. RAND.